United States Patent
Lin

(10) Patent No.: US 7,715,850 B2
(45) Date of Patent: May 11, 2010

(54) METHOD AND APPARATUS FOR IDENTIFYING TRANSMITTERS IN A WIRELESS COMMUNICATION SYSTEM USING POWER PREDICTIONS

(75) Inventor: Ie-Hong Lin, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1145 days.

(21) Appl. No.: 10/688,383

(22) Filed: Oct. 17, 2003

(65) Prior Publication Data

US 2004/0137912 A1 Jul. 15, 2004

Related U.S. Application Data

(60) Provisional application No. 60/420,540, filed on Oct. 22, 2002, provisional application No. 60/441,981, filed on Jan. 21, 2003.

(51) Int. Cl.
*H04W 24/00* (2009.01)
*G01S 3/02* (2006.01)
*H04M 11/04* (2006.01)

(52) U.S. Cl. ............. 455/456.1; 455/404.2; 455/456.5; 342/464

(58) Field of Classification Search .............. 455/456.3, 455/404.1, 404.2, 456.5, 437, 442, 423, 9, 455/424, 67.11, 115.1, 67.14, 456.6, 456.2, 455/440, 443, 456.1; 342/464, 450
See application file for complete search history.

(56) References Cited

U.S. PATENT DOCUMENTS 5,873,040 A * 2/1999 Dunn et al. .............. 455/456.2

(Continued)

FOREIGN PATENT DOCUMENTS

JP 11340855 12/1999

(Continued)

OTHER PUBLICATIONS

Yamamoto, et al., "Position Location Technologies Using Signal Strength in Cellular Systems", May 2001, IEEE Vehicular Technology Conference, pp. 2570-2574.

(Continued)

*Primary Examiner*—George Eng
*Assistant Examiner*—Brandon J Miller
(74) *Attorney, Agent, or Firm*—Donald C. Kordich; Andrea L. Mays

(57) ABSTRACT

Identification of transmitters for signals received by a terminal. To determine the transmitter of a given received signal, a list of candidate transmitters that may have transmitted that signal is determined. A coverage zone to use for the received signal is also determined. This coverage zone is the area where the terminal may receive the signal being identified. The predicted power for each candidate transmitter is then determined, e.g., using a path loss prediction model and the coverage zone. The predicted powers for the candidate transmitters are compared (directly or relatively) against the measured power of the received signal. The candidate transmitter with (direct/relative) predicted power closest to the (direct/relative) measured power is deemed as the one that transmitted the signal. Propagation delays may also be predicted and used for transmitter identification. The identified transmitters may be used to determine a position estimate for the terminal.

26 Claims, 9 Drawing Sheets

U.S. PATENT DOCUMENTS

| | | | |
|---|---|---|---|
| 6,119,005 A * | 9/2000 | Smolik ........................ 455/436 |
| 6,161,018 A * | 12/2000 | Reed et al. ................ 455/456.1 |
| 6,246,861 B1 * | 6/2001 | Messier et al. ............. 455/12.1 |
| 6,263,208 B1 * | 7/2001 | Chang et al. ............. 455/456.3 |
| 6,424,837 B1 * | 7/2002 | Hall et al. ................. 455/456.5 |
| 6,445,917 B1 * | 9/2002 | Bark et al. .................. 455/423 |
| 6,546,258 B1 * | 4/2003 | Nohara et al. ............ 455/456.1 |
| 6,560,462 B1 * | 5/2003 | Ravi et al. ............... 455/456.1 |
| 6,643,521 B1 * | 11/2003 | Bourgoin et al. ............. 455/522 |
| 6,832,090 B2 | 12/2004 | Riley et al. |
| 6,853,847 B2 * | 2/2005 | Shioda et al. ............ 455/456.1 |
| 6,865,394 B2 * | 3/2005 | Ogino et al. ............. 455/456.1 |
| 6,865,395 B2 * | 3/2005 | Riley ....................... 455/456.1 |
| 6,871,077 B2 * | 3/2005 | Kennedy, Jr. ............. 455/456.5 |
| 6,920,329 B2 * | 7/2005 | Kennedy et al. ......... 455/456.1 |
| 7,123,928 B2 * | 10/2006 | Moeglein et al. ......... 455/456.3 |
| 2002/0039905 A1 * | 4/2002 | Remy ........................ 455/456 |
| 2003/0129992 A1 * | 7/2003 | Koorapaty et al. .......... 455/456 |
| 2003/0148774 A1 * | 8/2003 | Naghian et al. ............. 455/456 |

FOREIGN PATENT DOCUMENTS

| | | |
|---|---|---|
| JP | 2001168684 | 6/2001 |
| WO | 0152569 | 7/2001 |
| WO | 0251192 | 6/2002 |

OTHER PUBLICATIONS

Reed, et al., "An Overview of the Challenges and Progress in Meeting the E-911 Requirement for Location Service", Apr. 1998, IEEE Communications Magazine, pp. 30-37.

International Search Report, PCT/US03/033680, International Search Authority, European Patent Office, Oct. 19, 2004.

International Preliminary Report on Patentability, PCT/US03/033680, International Preliminary Examining Authority, United States, May 11, 2006.

* cited by examiner

METHOD AND APPARATUS FOR IDENTIFYING TRANSMITTERS IN A WIRELESS COMMUNICATION SYSTEM USING POWER PREDICTIONS

This application claims priority to U.S. Provisional Application No. 60/420,540, filed on Oct. 22, 2002 and U.S. Provisional Application No. 60/441,981, filed on Jan. 21, 2003.

BACKGROUND

1. Field

The present invention relates generally to position determination, and more specifically to a method and apparatus for identifying transmitters in a wireless communication system using power predictions.

2. Background

It is often desirable, and sometimes necessary, to know the position of a wireless user. For example, the Federal Communications Commission (FCC) has adopted a report and order for an enhanced 911 (E-911) wireless service that requires the location of a wireless terminal (e.g., a cellular phone) to be provided to a Public Safety Answering Point (PSAP) each time a 911 call is made from the terminal. In addition to the FCC mandate, service providers may use location services (i.e., services that identify the position of wireless terminals) in various applications to provide value-added features and possibly generate additional revenues.

The position of a wireless device may be determined based on various position determination systems. One such system is the well-known Global Positioning System (GPS), which is a "constellation" of 24 well-spaced satellites that orbit the earth. Another such system is a wireless communication system, e.g., a cellular communication system that includes a number of base stations to support communication with a number of user terminals.

In general, an accurate position estimate for a wireless device may be obtained based on (1) distances or ranges from the device to a sufficient number of transmitters (typically three or four), and (2) the locations of these transmitters. Each transmitter may correspond to a GPS satellite or an earth-bound base station in the cellular system. The range to each transmitter may be estimated based on the signal transmitted by the transmitter. The location of each transmitter can typically be ascertained if its identity is known. The identity of each transmitter may be provided in the signal transmitted by the transmitter.

In many instances, the number of signals required to compute an accurate position estimate cannot be received by the wireless device, or the range information is not available. In these instances, a coarse position estimate for the wireless device may be obtained based on other information for the transmitters whose signals are received by the wireless device. For example, a coarse position estimate may be obtained for the wireless device based on knowledge of the locations and/or the coverage areas of the base stations received by the device. In any case, the identity of a base station would need to be ascertained before its signal can be used for position determination.

For a CDMA communication system, each base station may be identified based on various types of information. First, each base station may be unambiguously identified based on information included in certain overhead messages transmitted by the base station. However, to receive and recover these messages, the wireless device would need to establish communication with the base station. Second, each base station may be identified based on a pseudo-random number (PN) sequence assigned to the base station. For a CDMA system, each base station is assigned a specific offset of the PN sequence, which is different from the offsets assigned to neighboring base stations. Each base station uses its assigned PN sequence to spectrally spread data prior to transmission over the air. However, due to a limited number of PN offsets available, multiple base stations in the system may be assigned with the same PN offset. Thus, it may not be possible to unambiguously identify a given base station based solely on the PN phase of the signal received from that base station.

There is therefore a need in the art for a method and apparatus that can identify the transmitters in a wireless communication system.

SUMMARY

A method and apparatus is described herein to identify the transmitters of signals received by a wireless device. These transmitters may be base station transceiver subsystems (BTSs) in a cellular communication system (e.g., a CDMA system) and the wireless device may be a user terminal (e.g., a cellular phone). The transmitter for each received signal is identified based on predicted powers for candidate transmitters that may have transmitted the signal.

In one embodiment of the disclosed method and apparatus, the transmitters for a number of signals received by a terminal are identified one at a time using power predictions. To determine the transmitter for a given received signal, a list of candidate transmitters that may have transmitted that signal is first determined. For a CDMA system, the candidate transmitters may be BTSs with the same PN offset as that of the received signal being identified. A coverage zone to use for the received signal is also determined. This coverage zone is the area where the terminal may receive the signal being identified. The coverage zone may be determined based on the coverage areas of the transmitters that have already been identified.

The predicted power for each candidate transmitter in the list is then determined. The predicted power may be obtained using a path loss prediction model (e.g., the Okumura-Hata model). Moreover, the predicted power is obtained for the centroid of the coverage zone. For example, the terrain and land cover/land use for the coverage zone may be provided to and used by the path loss prediction model to obtain the predicted power. The predicted power may also be obtained for the centroid of the coverage zone (i.e., the terminal is hypothesized to be located at the coverage zone center).

The predicted powers for the candidate transmitters are then compared against the measured power of the received signal to determine the transmitter for the received signal. The comparison between the predicted power and the measured power may be performed based on a direct power comparison scheme or a relative power comparison scheme. For the direct power comparison scheme, the predicted power for each candidate transmitter is compared directly against the measured power of the received signal. For the relative power comparison scheme, the predicted power and measured power for a reference transmitter are also obtained. A relative predicted power is then determined for each candidate transmitter as the difference between the predicted power of the reference transmitter and the predicted power of the candidate transmitter. A relative measured power is also determined as the difference between the measured power for the reference transmitter and the measured power of the received signal. The relative predicted power for each candidate transmitter is then compared against the relative measured power. For both schemes, the candidate transmitter with predicted power (or relative predicted power) closest to the measured power (or relative measured power) is deemed as the one that transmitted the signal.

The propagation delay of the signal from each candidate transmitter may also be predicted and used in the identification of the transmitter for the received signal. In this case, the predicted propagation delay for each candidate transmitter may be compared against the measured propagation delay of the received signal (using either the direct or relative comparison scheme, in a similar manner as for the predicted power). The result of the predicted delay comparison can be combined with the result of the predicted power comparison. The transmitter for the received signal is then identified based on the combined result.

Various aspects and embodiments of the disclosed method and apparatus are described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

Figure 1:
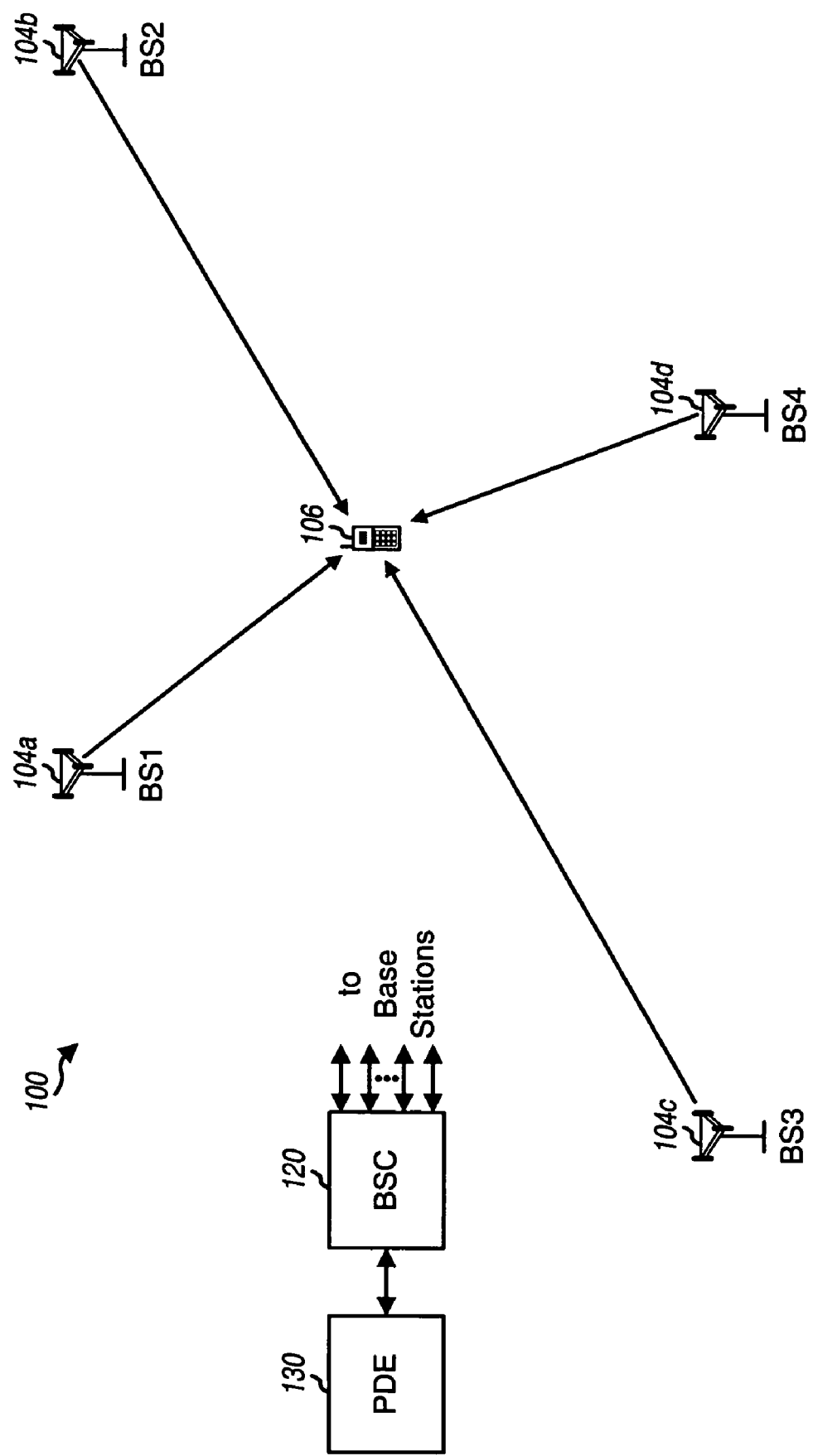
FIG. 1 shows a wireless communication system.

FIG. 1 is a diagram of a wireless communication system 100. System 100 includes a number of base stations 104, with each base station serving a particular geographic area. Only four base stations 104a through 104d are shown in FIG. 1 for simplicity. A base station may also be referred to as an access point, a Node B, or some other terminology.

A number of terminals 106 are typically dispersed throughout the system (only one terminal is shown in FIG. 1 for simplicity). Each terminal 106 may actively communicate with one or more base stations. Active communication between the terminal and multiple base stations at the same time is referred to as "soft handoff". Active communication refers to the fact that the terminal is registered with the system and can be identified by the base station. Even if the terminal is not in active communication with a base station, it may receive pilots, pages, and/or other signaling messages from the base stations. In the example shown in FIG. 1, terminal 106 receives pilots from all four base stations 104a through 104d.

Base stations 104 typically communicate with a base station controller (BSC) 120, which coordinates the communication between the base stations and the terminals that are in active communication with these base stations. For position determination, the base station controller may further communicate with a position determining entity (PDE) 130, which receives pertinent information from and/or provides information to the base station controller.

Figure 2:
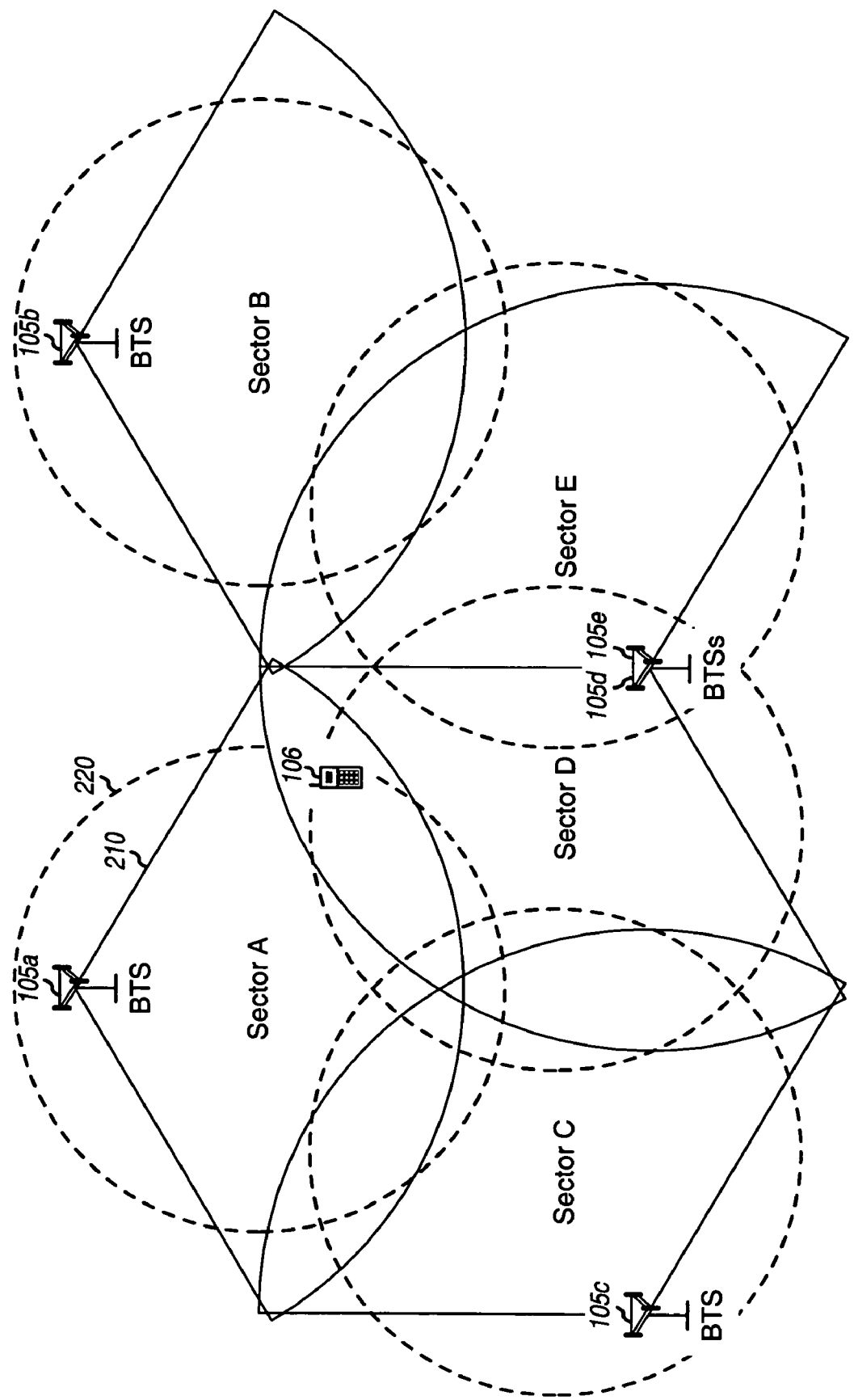
FIG. 2 illustrates the "sectorized" coverage areas for four base stations.

FIG. 2 is a diagram illustrating "sectorized" coverage areas (commonly referred to as sectorized cells) for the four base stations shown in FIG. 1. Each base station in the system provides coverage for a particular geographic area. The coverage area of each base station is the area within which the terminals may receive the signal transmitted by the base station. The size and shape of each base station's coverage area are typically dependent on various factors such as terrain, obstructions, and so on. For simplicity, the coverage area of each base station is often represented by an ideal circle.

In a typical system deployment, to increase capacity, the coverage area of each base station may be partitioned into a number of sectors (e.g., three sectors). For simplicity, each sector is often represented by an ideal 120° pie-shaped wedge 210. In an actual deployment, the coverage area of each base station often has a shape that is different from the ideal circle, and the shape of each sector is also different from the ideal pie-shaped wedge. Moreover, the sectors of a sectorized coverage area typically overlap at the edges.

Each sector is served by a corresponding base transceiver subsystem (BTS). For a coverage area that has been sectorized, the base station serving that coverage area may then include all of the BTSs serving the sectors of that coverage area. For simplicity, only five sectors A through E are shown in FIG. 2 for the four coverage areas served by base stations 104a through 104d in FIG. 1. These five sectors A through E are served by BTSs 105a through 105e, respectively. For simplicity, the coverage area of each BTS may also be represented by an ideal circle 220 instead of pie-shaped wedge 210.

The method and apparatus described herein for identifying transmitters based on power predictions may be used for various wireless communication systems. Thus, system 100 may be a code division multiple access (CDMA) system, a time division multiple access (TDMA) system, a frequency division multiple access (FDMA) system, or some other wireless communication system. A CDMA system may be designed to implement one or more CDMA standards such as IS-95, IS-2000, W-CDMA, and so on. A TDMA system may be designed to implement one or more TDMA standards such as GSM and GPRS. These standards are well known in the art. For clarity, certain embodiments of the disclosed method and apparatus are described specifically for a CDMA system.

Figure 3A:
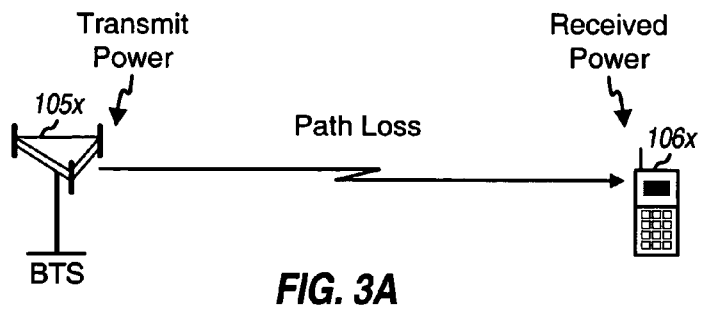
FIG. 3A illustrates a signal transmission from a BTS to a terminal.

FIG. 3A is a diagram illustrating a signal transmission from a single BTS 105x to a terminal 106x. A signal is transmitted from the antenna of the BTS at a particular transmit power level, $P_{tx}$. This signal propagates through a wireless link and is received by the terminal at a particular received power level, $P_{rx}$. The received power $P_{rx}$ is typically much smaller than the transmit power $P_{tx}$. The amount of attenuation in power is determined by the path loss of the wireless link.

Figure 3B:
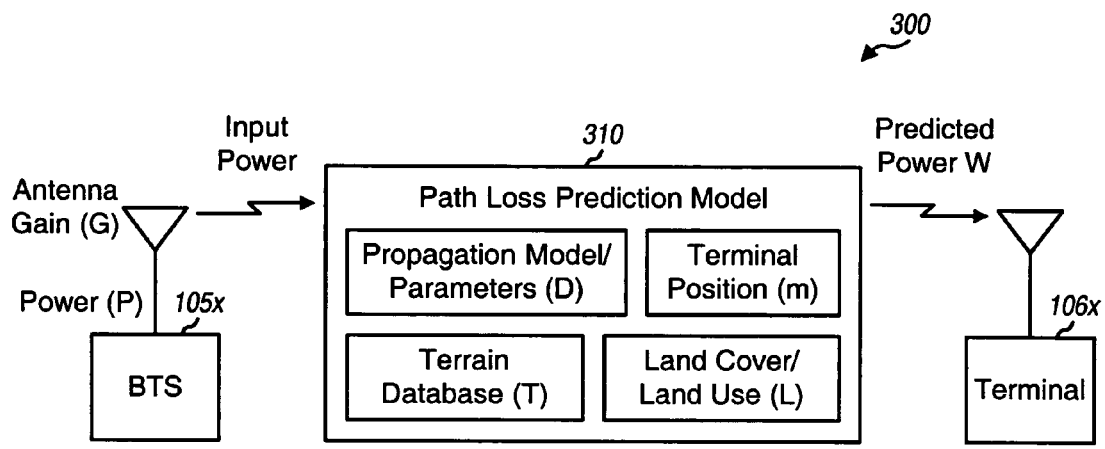
FIG. 3B shows a model used to predict the power of the signal received by the terminal.

FIG. 3B is a diagram illustrating a model 300 used to predict the power of a signal received by terminal 106x, after it has propagated through the wireless link from transmitting BTS 105x. In model 300, BTS 105x is described with two parameters: power (P) and antenna gain (G). The power P represents the power at the input port of the BTS antenna (i.e., before the antenna amplifier). The antenna gain G represents the gain provided by the BTS antenna for the sector being served by the BTS. The transmit power $P_{tx}$ at the BTS antenna can be determined based on the power P and the antenna gain G (i.e., $P_{tx}(dBW)=P(dBW)+G(dB)$).

A path loss prediction model 310 is used to predict the path loss of the wireless link between BTS 105x and terminal 106x. Path loss prediction model 310 may be defined using any one of a number of prediction models, such as the Okumura-Hata model, the COST231 Hata model, the COST231 Walfish-Ikegami model, Lee's model, the Free-Space model, and so on. The Okumura-Hata model is described in further detail below.

As shown in FIG. 3B, path loss prediction model 310 utilizes a set of parameters. These parameters are briefly described below.

Propagation model/parameters (D)—this denotes the specific model used for path loss prediction model 310 (e.g., the Okumura-Hata model).

Terrain database (T)—this database includes information regarding terrain undulation, which is used to predict the path loss between the BTS and terminal.

Land cover/land use database (L)—this database includes information regarding land cover and land use for the propagation path.

Terminal position (m)—this is a hypothesized position for the terminal. The predicted power is determined for/at this position.

The predicted power for the signal received by terminal 106x may be obtained using the path loss prediction model and the parameters described above. The predicted power W for the received signal may be expressed as a function of these parameters, as follows:

$$W(G, P, D, T, L, m),\qquad\text{Eq (1)}$$

where G, P, D, T, L, and m are the parameters described above.

The predicted power W may be used to identify the transmitter of the signal received by the terminal. The transmitter identification may be performed based on various comparison schemes, including a direct power comparison scheme and a relative power comparison scheme. Each of these schemes is described in further detail below.

Direct Power Comparison

Figure 4:
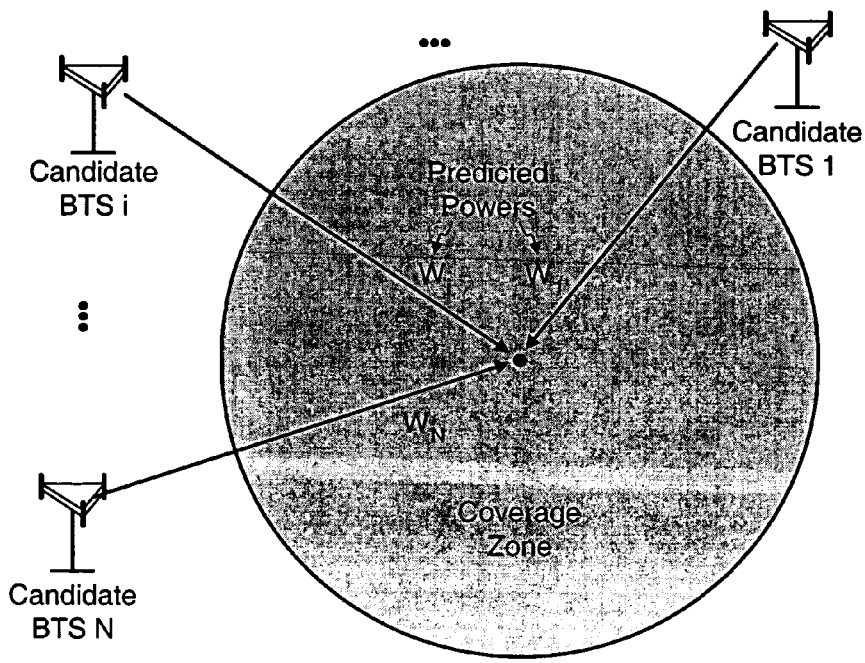
FIG. 4 illustrates the identification of the BTS for one received signal using a direct power comparison scheme.

FIG. 4 illustrates the identification of the BTS for one received signal at the terminal using the direct power comparison scheme. For this received signal, a list of candidate BTSs that may have transmitted the signal is initially determined, as described below. Pertinent information for each candidate BTS is assumed to be known or ascertainable. Such information may include the location of the BTS and its power (P) and antenna gain (G). A coverage zone to be used for this received signal is also determined. This coverage zone is the area where the terminal may receive the signal being identified. The coverage zone may be determined as described below.

For each candidate BTS in the list, the received signal is hypothesized to have been transmitted from this BTS. The predicted power of the received signal may then be obtained using the path loss prediction model and information for the BTS and the coverage zone. More specifically, to obtain the predicted power $W_i$ for the i-th candidate BTS using the power prediction model shown in FIG. 3B, the following parameters are provided to and used for the model:

1) the power ($P_i$) and antenna gain ($G_i$) are for the i-th candidate BTS,
2) the propagation model/parameters (D) may be, for example, the Okumura-Hata model,
3) the terrain (T) and land cover/land use (L) are for the coverage zone, and
4) the terminal position (m) may be chosen as the centroid of the coverage zone.

Based on all of these parameters, the power prediction model provides the predicted power $W_i$ for the i-th candidate BTS.

The predicted power $W_i$ is obtained for each candidate BTS in the list. For the direct power comparison method, the predicted power $W_i$ for each candidate BTS is compared directly against the measured power Ec of the received signal. The candidate BTS with predicted power closest to the measured power is then identified as the one that transmitted the received signal. This condition may be expressed as:

$$\operatorname*{Min}_{i\in I}\{|W_i - Ec|\},\qquad\text{Eq (2)}$$

where $W_i$ is the predicted power for the i-th candidate BTS,

Ec is the measured power of the received signal being identified, and

I represents the list of candidate BTSs.

In a wireless communication system, a terminal may receive a number of signals from a number of BTSs. For position determination and other purposes, it may be necessary to identify the BTS that transmitted each of these received signals.

Figure 5:
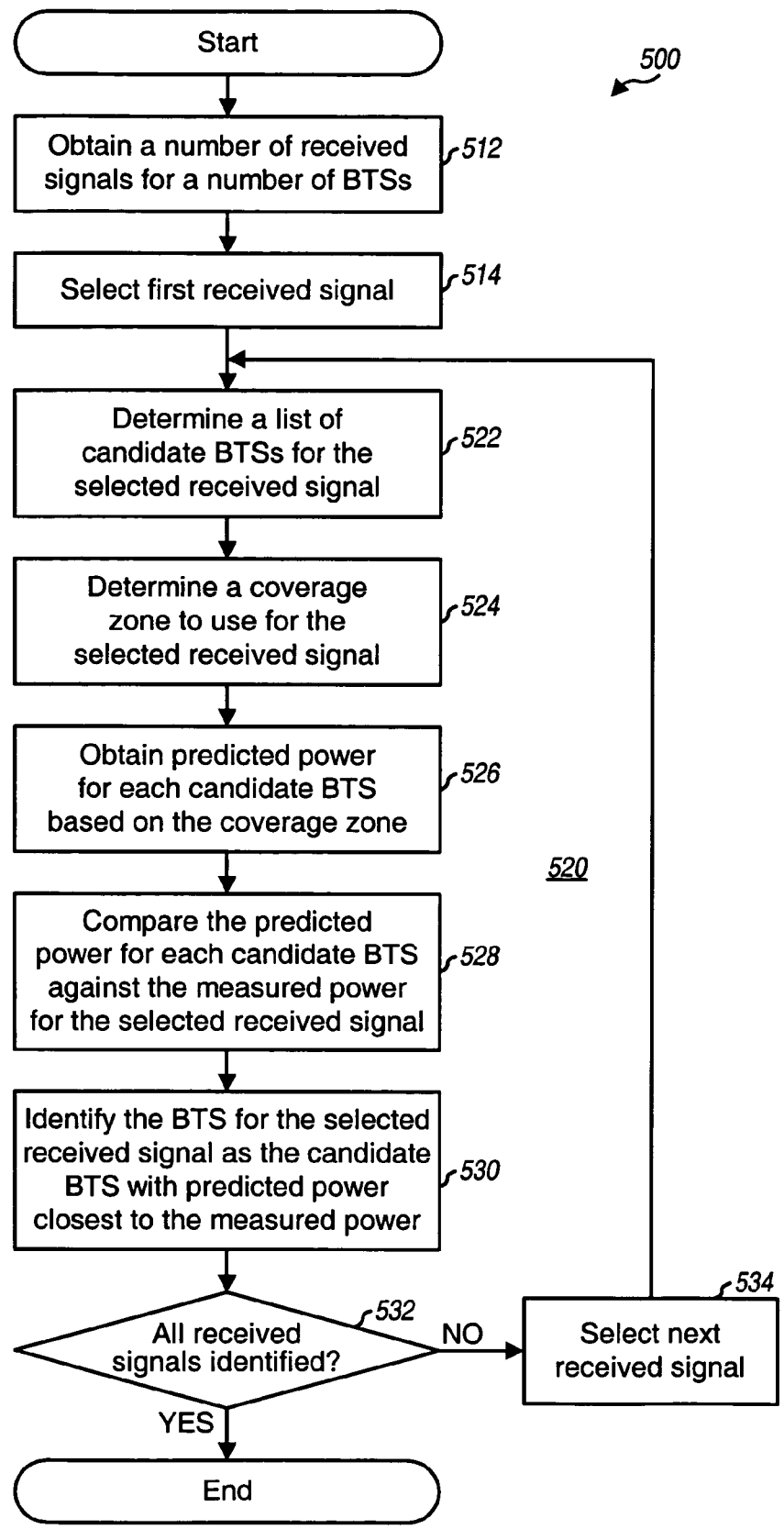
FIG. 5 is a flow diagram of a process for identifying the transmitters for a number of received signals using the direct power comparison scheme.

FIG. 5 is a flow diagram of a process 500 for identifying the transmitters for signals received by the terminal using the direct power comparison scheme. Process 500 may be performed by various system entities, such as the terminal, BTSs, MSC and PDE.

Initially, a number of received signals for a number of BTSs are obtained (step 512). These are the signals received by the terminal from the BTSs. If the BTS identification is performed by an entity other than the terminal, then a list of these received signals and pertinent information are provided to that entity. Typically, one of the received signals is from the BTS with which the terminal has derived its time reference from, and this BTS is often referred to as the "reference" BTS. The identity and other information for the reference BTS (such as its location and coverage area) is typically known (e.g., based on signaling messages transmitted by this BTS and a base station database that the position computing entity has). For the remaining received signals, the BTS that transmitted each of these signals may be identified, one signal at a time, via a loop 520.

The first received signal is selected for identification (e.g., by setting an index j to 1, or j=1) (step 514). For this selected received signal, a list of candidate BTSs that may have transmitted the signal is determined (step 522). The determination of the candidate list is described below. The coverage zone to use for the selected received signal is then determined (step 524). For the first iteration, the coverage zone may be set as the coverage area of the reference BTS. The coverage zone may also be set to some other area like a building known to be served by the reference BTS or the coverage area of a repeater deployed for the reference BTS.

The predicted power $W_{i,j}$ is then obtained for each candidate BTS in the list based on the coverage zone (step 526). In particular, various parameters for the coverage zone (e.g., terrain, land cover/land use, and so on) may be provided to the path loss prediction model. The predicted power may also be obtained, for example, for the centroid of the coverage zone (i.e., the terminal position m may be chosen as the centroid of the coverage zone). The result of step 526 is a list of predicted powers for the list of candidate BTSs. The predicted power $W_{i,j}$ for each candidate BTS is then compared against the measured power $Ec_j$ of the selected received signal (step 528). The candidate BTS with predicted power closest to the measured power is then identified as the BTS for the selected received signal (step 530). This condition may be expressed as:

$$\underset{i \in I_j}{\text{Min}}\{|W_{i,j} - Ec_j|\}, \qquad \text{Eq (3)}$$

where
  $W_{i,j}$ is the predicted power of the j-th received signal for the i-th candidate BTS,
  $Ec_j$ is the measured power of the j-th received signal, and
  $I_j$ represents the list of candidate BTSs for the j-th received signal.

A determination is then made whether or not all received signals have been identified (step 532). If the answer is yes, then the process terminates. Otherwise, the next received signal is selected (e.g., by incrementing the index j, or j=j+1) (step 534). The process then returns to step 522 to identify the BTS for the new selected received signal.

For each iteration through loop 520, one received signal is selected and the BTS that transmitted the selected received signal is identified using direct power comparison. For each selected received signal, a list of candidate BTSs for that signal is first determined in step 522, and the coverage zone to use for that signal is determined in step 524.

The coverage zone for the first iteration may be set to the coverage area of the reference BTS, as described above. The coverage zone for each subsequent iteration may be set to a composite coverage area for all BTSs that have been identified. For example, the coverage zone for the second iteration may be set to a composite coverage area obtained based on the coverage areas of the reference BTS and the BTS for the first selected received signal (i.e., the first identified BTS), which was identified in the first iteration. The coverage zone for the third iteration may be set to a composite coverage area obtained based on the coverage areas of the reference BTS and the first and second identified BTSs (i.e., the BTSs for the first and second selected received signals). If the predicted powers for the candidate BTSs are obtained for the centroid of the coverage zone, then the predicted powers are obtained based on the latest centroid for each iteration through loop 520.

Figure 6:
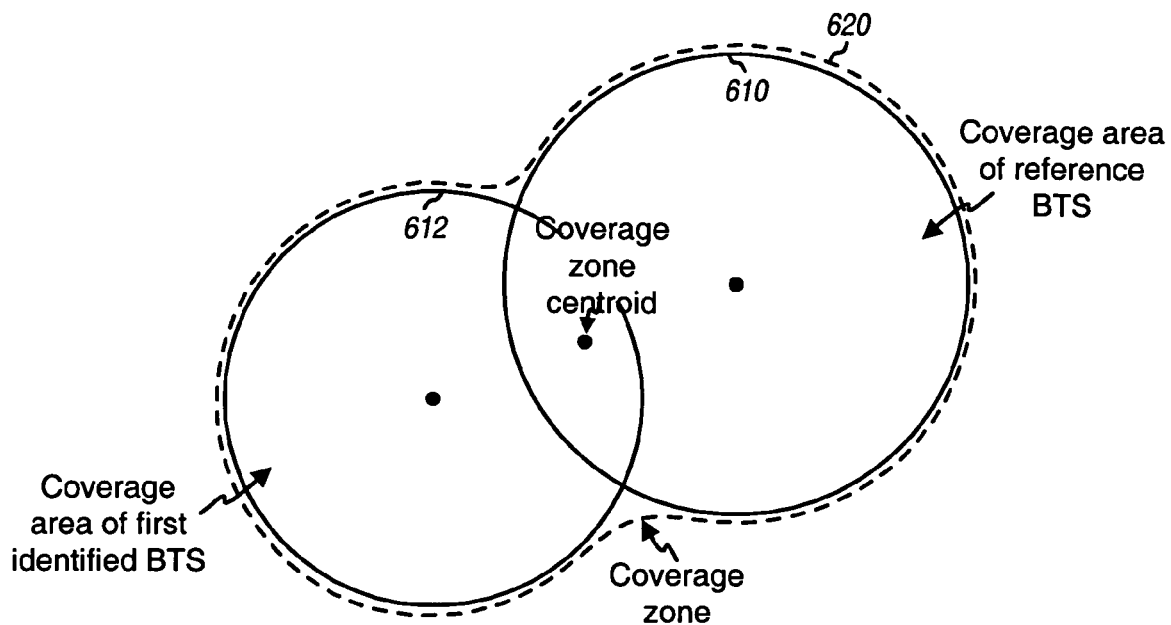
FIG. 6 illustrates the determination of a coverage zone.

FIG. 6 is a diagram illustrating the determination of the coverage zone for the second received signal to be identified. In FIG. 6, the coverage area of the reference BTS is represented by a circle 610, and the coverage area of the first identified BTS is represented by a circle 612. The coverage zone for the second received signal is the composite of the coverage areas of the reference BTS and the first identified BTS. This coverage zone is represented by a circle 620 and is the area where the terminal can receive the signals from both of these BTSs. The coverage zone may be obtained as the union of the coverage areas of both BTSs. The centroid of this coverage zone represents a new centroid that may be used as the terminal's position (m) in the power prediction model for the second received signal.

The coverage area of each BTS may be modeled in various manners. For example, the BTS coverage area may be modeled based on the BTS's maximum antenna range (MAR), the location and orientation of the BTS antenna, and so on.

Relative Power Comparison

Figure 7:
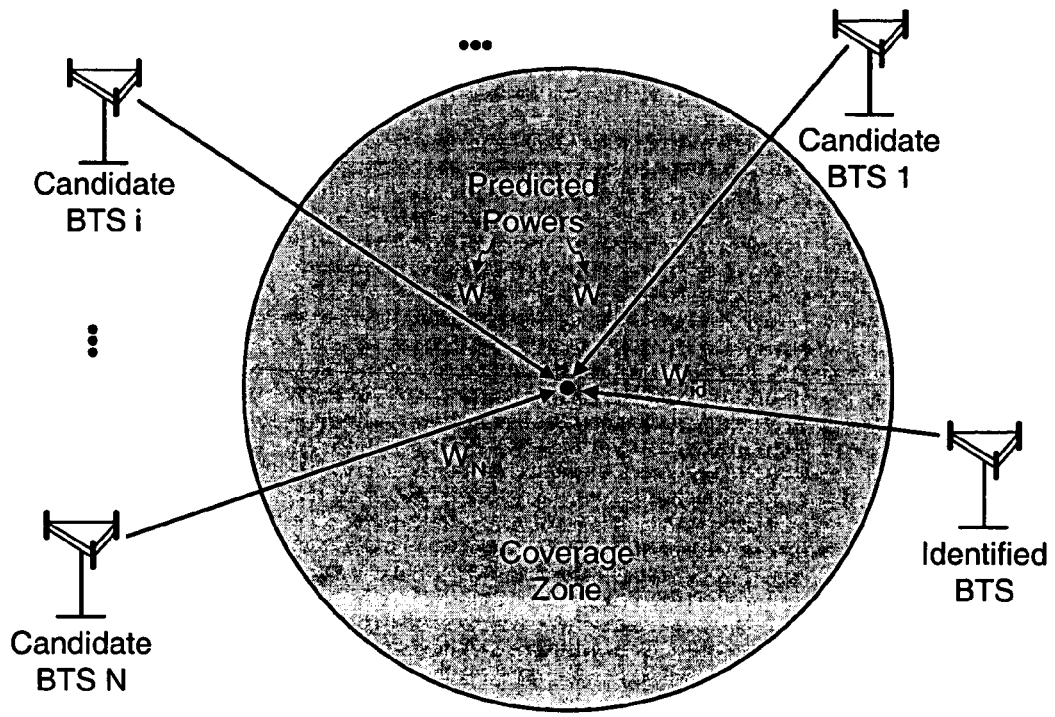
FIG. 7 illustrates the identification of the BTS for one received signal using a relative power comparison scheme.

FIG. 7 illustrates the identification of the BTS for one received signal at the terminal using the relative power comparison scheme. For this received signal, a list of candidate BTSs that may have transmitted the signal is initially determined. Pertinent information for each candidate BTS (such as power P and antenna gain G) is assumed to be known or ascertainable. A coverage zone to use for this received signal is also determined.

For each candidate BTS in the list, the received signal is hypothesized to have been transmitted from this BTS. The predicted power of the received signal may then be obtained for this BTS using the path loss prediction model and information for the BTS and the coverage zone. Based on all of the parameters, the power prediction model provides the predicted power $W_i$ for the i-th candidate BTS.

The predicted power is obtained for each candidate BTS in the list. Additionally, the predicted power $W_{id}$ is also obtained for an identified BTS. This identified BTS may be the reference BTS or a BTS that has been identified earlier. A relative predicted power for each candidate BTS can be determined as $|W_{id} - W_i|$. A relative measured power for the received signal can be determined as $|Ec_{id} - Ec|$.

For the relative power comparison method, the relative predicted power for each candidate BTS is compared against the relative measured power for the received signal. The candidate BTS with relative predicted power closest to the relative measured power is then identified as the one that transmitted the received signal. This condition may be expressed as:

$$\underset{i \in I}{\text{Min}}\{||W_{id} - W_i| - |Ec_{id} - Ec|\}, \qquad \text{Eq (4)}$$

where
  $W_i$ is the predicted power for the i-th candidate BTS,
  $W_{id}$ is the predicted power for the identified BTS,
  Ec is the measured power of the received signal being identified, and
  $Ec_{id}$ is the measured power of the signal from the identified BTS.

Figure 8:
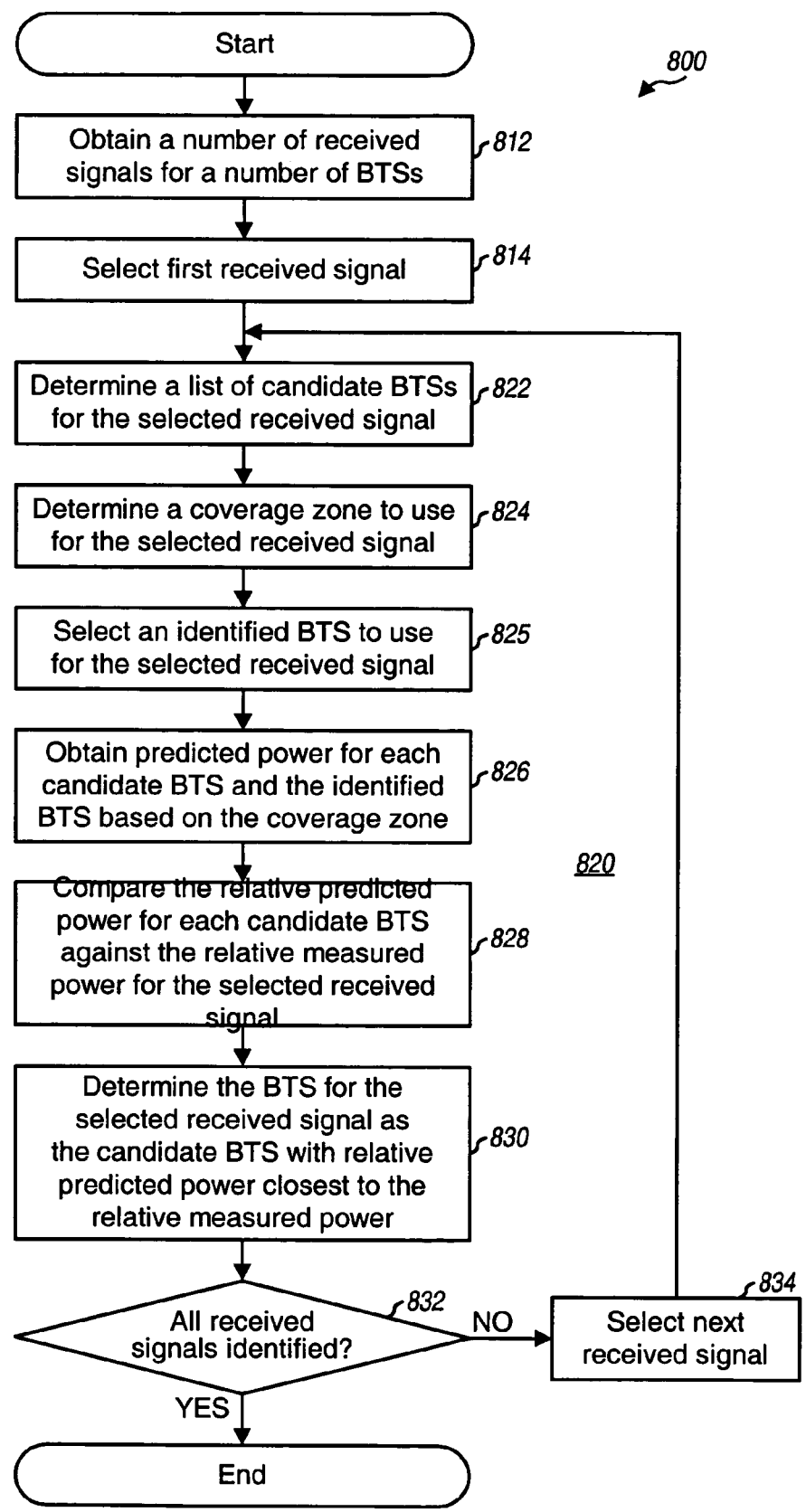
FIG. 8 is a flow diagram of a process for identifying the transmitters for a number of received signals using the relative power comparison scheme.

FIG. 8 is a flow diagram of a process 800 for identifying the transmitters for signals received by the terminal using the relative power comparison scheme. Initially, a number of received signals for a number of BTSs are obtained (step 812). Again, one of the received signals is typically from the reference BTS, whose identity is known. The BTS for each of the remaining received signals may then be identified, one at a time, via a loop 820.

The first received signal is selected for identification (step 814), and a list of candidate BTSs that may have transmitted this signal is determined (step 822). The coverage zone to use for the selected received signal is then determined (step 824). For the first iteration, the coverage zone may be set as the coverage area of the reference BTS. For each subsequent iteration, the coverage zone may be set as the composite coverage area for all BTSs that have been identified.

An identified BTS is then selected for use in this iteration (step 825). The identified BTS is the one whose predicted power and measured power will be used to obtain the relative predicted power and relative measured power, respectively. For the first iteration, the identified BTS may be the reference BTS. For each subsequent iteration, the identified BTS may be the reference BTS, the BTS identified in the last iteration, the identified BTS with a coverage area that overlaps the coverage zone the most, all of the BTSs that have been identified thus far, or any combination of BTSs.

The predicted power $W_{i,j}$ is then obtained for each candidate BTS in the list based on the coverage zone (step 826). The predicted power $W_{id,j}$ is also obtained for the identified BTS. The predicted power for each BTS may be obtained for the centroid of the coverage zone. The result of step 826 is a list of predicted powers for the list of candidate BTSs and the predicted power for the identified BTS. The relative predicted power for each candidate BTS is then determined as $|W_{id,j} - W_{i,j}|$. The relative measured power for the received signal is determined as $|Ec_{id,j} - Ec_j|$.

The relative predicted power for each candidate BTS is then compared against the relative measured power for the received signal (step 828). The candidate BTS with the relative predicted power closest to the relative measured power is then identified as the BTS for the selected received signal (step 830). This condition may be expressed as:

$$\underset{i \in I_j}{\text{Min}}\{||W_{id,j} - W_{i,j}| - |Ec_{id,j} - Ec_j||\}, \qquad \text{Eq (5)}$$

where $W_{i,j}$ is the predicted power of the j-th received signal for the i-th candidate BTS, $W_{id,j}$ is the predicted power for the identified BTS used for the j-th received signal, $Ec_j$ is the measured power of the j-th received signal, and $Ec_{id,j}$ is the measured power of the signal from the identified BTS.

If multiple BTSs are used for the identified BTS, then the predicted power $W_{id,j}$ may be computed as the average predicted power for these BTSs, and the measured power $Ec_{id,j}$ may also be computed as the average measured power for these BTSs.

A determination is then made whether or not all received signals have been identified (step 832). If the answer is yes, then the process terminates. Otherwise, the next received signal is selected (step 834). The process then returns to step 822 to identify the BTS for the new selected received signal.

For each iteration through loop 820, one received signal is selected and the BTS that transmitted the selected received signal is identified using relative power comparison. For each selected received signal, a list of candidate BTSs for that signal is first determined in step 822, the coverage zone to use for that signal is determined in step 824, and the identified BTS is selected in step 825. The predicted powers for the candidate and identified BTSs are thus obtained based on the latest centroid for the coverage zone.

The relative power comparison scheme may provide more accurate results than the direct power comparison scheme. This is because the relative power comparison scheme may be able to remove common errors that appear for both the candidate and identified BTSs.

Power and Delay Comparison

Propagation delays may also be used in combination with predicted powers to identify the BTSs for the received signals. For many wireless communication systems, the time of transmission and the time of arrival (TOA) of each received signal may be ascertained based on information in the signal. For a CDMA system, the transmission and arrival times of each received signal may be determined based on the phase of the PN sequence used for spectral spreading. The propagation delay $PD_{meas}$ for each received signal may then be computed as the difference between the time of arrival and the time of transmission for the signal.

The propagation delay may also be predicted for each BTS based on the distance between the BTS and the terminal. In particular, the predicted propagation delay $PD_{pred}$ may be computed based on the distance for a line-of-sight path between the BTS location (which is known) and the terminal position (m).

For a direct power and delay comparison scheme, the BTS for a given received signal may be determined as:

$$\underset{i \in I}{\text{Min}}\{\alpha_p |W_i - Ec| + \alpha_d |PD_{pred,i} - PD_{meas}|\}, \qquad \text{Eq (6)}$$

where $PD_{pred,i}$ is the predicted propagation delay for the i-th candidate BTS, $PD_{meas}$ is the measured propagation delay for the received signal being identified, $\alpha_p$ is a weighting factor used for predicted power, and $\alpha_d$ is a weighting factor used for predicted propagation delay.

The other terms in equation (6) are described above for equation (2). In equation (6), the quantity $|W_i - Ec|$ is the "power delta" for the i-th candidate BTS, which is the difference between the predicted power for this BTS and the measured power of the received signal. The quantity $|PD_{pred,i} - PD_{meas}|$ is the "delay delta" for the i-th candidate BTS, which is the difference between the predicted delay for this BTS and the measured delay for the received signal. The weighting factors $\alpha_p$ and $\alpha_d$ determine the weights to be given to the power delta and the delay delta, respectively, in the identification of the BTS for the received signal.

For a relative power and delay comparison scheme, the BTS for a given received signal may be determined as:

$$\underset{i \in I}{\text{Min}}\{\alpha_p(|W_{id} - W_i| - |Ec_{id} - Ec|) + \qquad \text{Eq (7)}$$
$$\alpha_d(|PD_{pred,id} - PD_{pred,i}| - |PD_{meas,id} - PD_{meas}|)\},$$

where $PD_{pred,id}$ is the predicted propagation delay for the identified BTS, and $PD_{meas,id}$ is the measured propagation delay for the identified BTS.

The other terms in equation (7) are described above for equations (4) and (6). In equation (7), the quantity $|W_{id} - W_i| - |Ec_{id} - Ec|$ is the "relative power delta" for the i-th candidate BTS. The quantity $|PD_{pred,id} - PD_{pred,i}| - |PD_{meas,id} - PD_{meas}|$ is the "relative delay delta" for the i-th candidate BTS.

Figure 9:
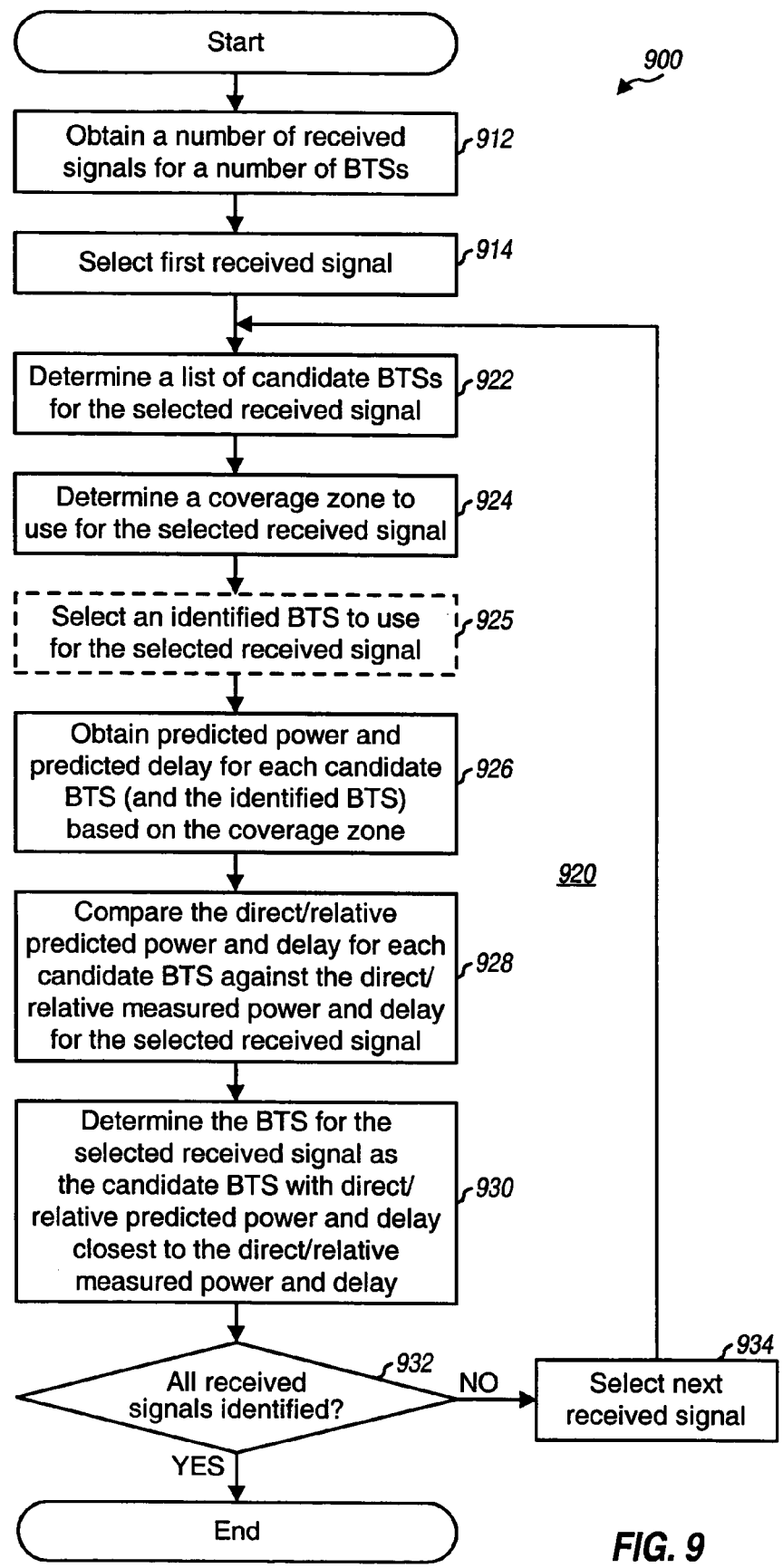
FIG. 9 is a flow diagram of a process for identifying the transmitters for a number of received signals using a power and delay comparison scheme.

FIG. 9 is a flow diagram of a process 900 for identifying the transmitters for signals received by the terminal using the power and delay comparison scheme. Initially, a number of received signals for a number of BTSs are obtained (step 912). One of the received signals is typically from the reference BTS, and the BTS for each of the remaining received signals may then be identified.

The first received signal is selected for identification (step 914), and a list of candidate BTSs that may have transmitted this signal is determined (step 922). The coverage zone to use for the selected received signal is then determined (step 924). The coverage zone may be set as (1) the coverage area of the reference BTS, for the first iteration, or (2) the composite coverage area for all identified BTSs, for each subsequent iteration. If relative comparison is to be performed, then an identified BTS is selected for use, as described above for FIG. 8 (step 925). If direct comparison is to be performed, then step 925 may be skipped. Step 925 may or may not be performed and is indicated as such by the dashed box.

The predicted power and predicted propagation delay are then obtained for each candidate BTS in the list based on the coverage zone (step 926). If relative comparison is to be performed, then the predicted power and delay are also obtained for the identified BTS. The result of step 926 is a list of predicted powers and delays for the list of candidate BTSs (and possibly the predicted power and delay for the identified BTS). The predicted power and delay for each BTS may be obtained for the centroid of the coverage zone. The direct (or relative) predicted power and delay for each candidate BTS is then compared against the direct (or relative) measured power and delay for the selected received signal (step 928). The candidate BTS with the direct/relative predicted power and delay closest to direct/relative measured power and delay is then identified as the BTS for the selected received signal (step 930).

The condition for the direct power and delay comparison may be expressed as:

$$\min_{i \in I_j} \{\alpha_p |W_{i,j} - Ec_j| + \alpha_d |PD_{pred,i,j} - PD_{meas,j}|\}. \quad \text{Eq (8)}$$

The condition for the relative power and delay comparison may be expressed as:

$$\min_{i \in I_j} \{\alpha_p(|W_{id,j} - W_{i,j}| - |Ec_{id,j} - Ec_j|) +$$
$$\alpha_d(|PD_{pred,id,j} - PD_{pred,i,j}| - |PD_{meas,id,j} - PD_{meas,j}|)\} \quad \text{Eq (9)}$$

In equations (8) and (9), the subscript j denotes the j-th received signal being identified.

A determination is then made whether or not all received signals have been identified (step 932). If the answer is yes, then the process terminates. Otherwise, the next received signal is selected (step 934). The process then returns to step 922 to identify the BTS for the new selected received signal.

The power and delay comparison schemes may provide more accurate results than the power comparison schemes. This is because additional information provided by propagation delay is used to identify the BTSs for the received signals.

Position Determination

Figure 10:
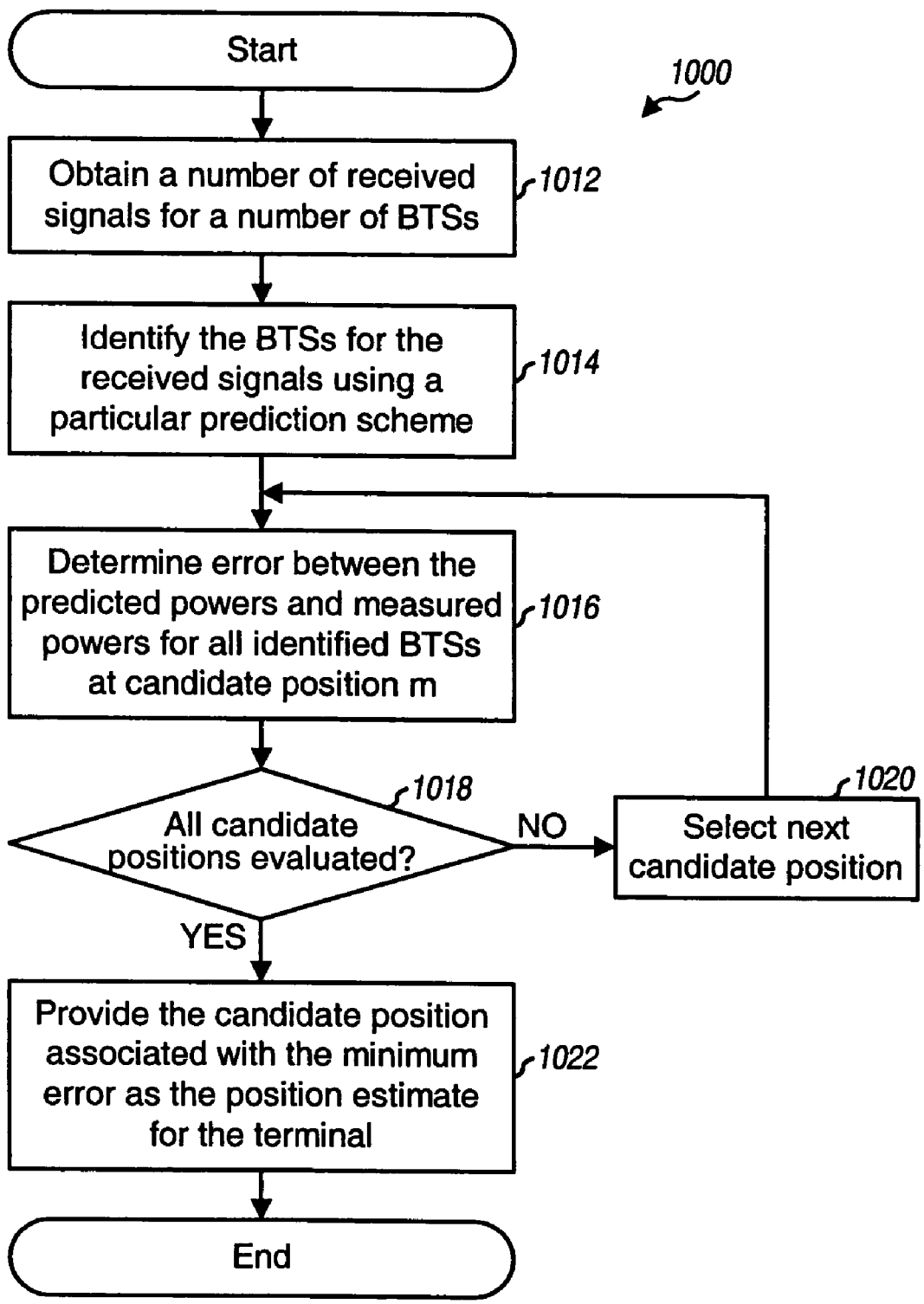
FIG. 10 is a flow diagram of a process for determining the position of the terminal using BTSs that have been identified using power predictions.

FIG. 10 is a flow diagram of an embodiment of a process 1000 for determining the position of a wireless terminal based on BTSs that have been identified using power predictions. Similar to processes 500, 800, and 900, process 1000 may be performed by various system entities, such as the terminal, BTSs, and PDE.

Initially, a number of received signals for a number of BTSs are obtained (step 1012). The BTSs for the received signals are then identified using a particular prediction scheme (step 1014). This prediction scheme may be (1) the direct power comparison scheme, (2) the relative power comparison scheme, (3) the direct power and delay comparison scheme, or (4) the relative power and delay comparison scheme. The results of step 1014 are identities of the BTSs for the received signals.

A position estimate for the terminal is then determined based on the identified BTSs. For a direct power comparison method, the (root sum square) error between the predicted powers and the measured powers for all identified BTSs at a candidate terminal position m is determined (step 1016), as follows:

$$\{\sum_{k \in K} |W_k(m) - Ec_k|^2\}^{1/2}, \quad \text{Eq (10)}$$

where
$W_k(m)$ is the predicted power for the k-th identified BTS at candidate position m,
$Ec_k$ is the measured power of the k-th identified BTS, and
K is a list of identified BTSs used to obtain a position estimate for the terminal.

A determination is then made whether or not all candidate positions for the terminal have been evaluated (step 1018). If the answer is no, then the next position in the list of candidate positions is selected (step 1020), and the process returns to step 1016 to determine the error for this new candidate position.

If all candidate positions have been evaluated, as determined in step 1018, then the candidate position associated with the minimum error is provided as the position estimate for the terminal (step 1022). This may be expressed as:

$$\min_{m \in M} \{\sum_{k \in K} |W_k(m) - Ec_k|^2\}^{1/2}, \quad \text{Eq (11)}$$

where M is a list of candidate positions for the terminal. The process then terminates.

The position of the terminal may also be estimated based on the relative power comparison method. In this case, the following applies:

$$\min_{m \in M} \{\sum_{k \in K} ||W_{id,k}(m) - W_k(m)| - |Ec_{id,k} - Ec_k||^2\}^{1/2}, \quad \text{Eq (12)}$$

where
$W_k(m)$ is the predicted power for the k-th identified BTS at candidate position m;
$W_{id,k}(m)$ is the predicted power for a designated BTS, which is used as a reference for the k-th identified BTS, at candidate position m, the designated BTS can be anyone of the identified BTSs;

$Ec_k$ is the measured power of the received signal from the k-th identified BTS; and $Ec_{id,k}$ is the measured power of the signal from the designated BTS for the k-th identified BTS.

The position of the terminal may also be estimated based on the direct power and delay comparison method. In this case, the following applies:

$$\underset{m \in M}{\text{Min}} \left\{ \sum_{k \in K} (\alpha_p |W_k(m) - Ec_k| + \alpha_d |PD_{pred,k}(m) - PD_{meas,k}|)^2 \right\}^{1/2}, \quad \text{Eq (13)}$$

where $PD_{pred,k}(m)$ is the predicted delay for the k-th identified BTS at candidate position m, $PD_{meas,k}$ is the measured delay for the k-th identified BTS, and the other terms are as defined above.

The position of the terminal may also be estimated based on the relative power and delay comparison method. In this case, the following applies:

$$\underset{m \in M}{\text{Min}} \left\{ \sum_{k \in K} (\alpha_p |W_{id,k}(m) - W_k(m)| - |Ec_{id,k} - Ec_k|) + \alpha_d (|PD_{pred,id,k}(m) - PD_{pred,k}(m)| - |PD_{meas,id,k} - PD_{meas,k}|))^2 \right\}^{1/2} \quad \text{Eq (14)}$$

where $PD_{pred,k}(m)$ is the predicted delay for the k-th identified BTS at candidate position m, $PD_{pred,id,k}(m)$ is the predicted delay for a designated BTS, which is used as a reference for the k-th identified BTS, at candidate position m, the designated BTS can be anyone of the identified BTSs, $PD_{meas,k}$ is the measured delay for the k-th identified BTS, $PD_{meas,id,k}$ is the measured delay for the designated BTS for the k-th identified BTS, and the other terms are as defined above.

The direct power comparison method, the relative power comparison method, the direct power and delay comparison method, and the relative power and delay comparison method may each be used alone to estimate the terminal position, as described above. Each of these methods may also be used together with an Advanced Forward Link Trilateration (A-FLT) method (or some other equivalent method) to estimate the terminal position. The A-FLT is known in the art and not described herein. When used together with the A-FLT method, the A-FLT method may be applied first to obtain an initial position estimate for the terminal with a particular position uncertainty. A list of candidate positions for the terminal is then obtained based on the initial position estimate and the position uncertainty. The direct power comparison method or the direct power and delay comparison method may then be applied to obtain a final position estimate for the terminal, as described above. The A-FLT method is thus used to obtain the list of candidate positions from which the final position estimate is selected.

Candidate List

The method and apparatus described herein for identifying transmitters for the received signals may be used in various wireless communication systems. For clarity, various aspects of the disclosed method and apparatus are now described specifically for a CDMA system, which may be an IS-95 or cdma2000system. In a CDMA system, each BTS spectrally spreads its data with a PN sequence prior to transmitting the data over the wireless link. (The PN sequence is referred to as a scrambling code in W-CDMA.) The same PN sequence is used by all BTSs in the CDMA system. However, to allow the terminals to differentiate the various BTSs in the system, each BTS is assigned a specific offset of the PN sequence. That is, the start of the PN sequence for each BTS is delayed by the assigned offset, which is typically given in multiples of 64 chips. Each chip corresponds to one bit in the PN sequence.

Each BTS also transmits a pilot that is used by the terminals to estimate the wireless link, for timing and frequency tracking, and for other purposes. The pilot is typically a sequence of either all zeros or all ones that is spectrally spread by the PN sequence. The pilot for each BTS is normally transmitted at a known (or ascertainable) power level.

At a given terminal, the signals from a number of BTSs may be received by the terminal. Moreover, the signal transmitted by each BTS may be received via multiple signal paths. Thus, the terminal may receive one or multiple signal instances for each of a number of BTSs. All of the signal instances would be included in the receiver input signal for the terminal (i.e., the signal from the terminal antenna).

For CDMA, a searcher is typically used to search through the receiver input signal to look for strong signal instances. The search is typically performed by correlating the receiver input signal with the PN sequence at various phases. If a signal instance is present at any given PN phase, then a high correlated result is obtained. Each found signal instance of sufficient strength may be characterized by (1) a time of arrival at the terminal and (2) a measured power (Ec) or received signal strength (Ec/Io). The arrival time of each signal instance may be given by its PN phase, which is in turn determined by (1) the PN offset assigned to the BTS that transmits the signal and (2) the propagation delay experienced by the signal instance (i.e., $PN_{rx} = 64 \cdot PN_{offset} + PN_{delay}$, where the PN offset is given in units of 64 PN chips). Since the propagation delay is typically much less than one PN offset, the PN phase of the signal instance may be used to determine the PN offset of the BTS that transmitted the signal (i.e., $PN_{rx} \approx 64 \cdot PN_{offset}$ since $PN_{delay} \ll 64$ chips).

Since the searcher typically processes the pilot to search for strong signal instances in the receiver input signal, the measurement for each signal instance is often referred to as a pilot phase measurement. The power of the pilot, as received at the terminal, may be used as the measured power for the signal instance. The received signal strength for the signal instance may be obtained as the ratio of the pilot power over the total noise and interference in the receiver input signal.

As noted above, a number of signal instances may be received by the terminal for a given BTS. The signal instances for the same BTS may be identified as such since they have PN phases within a particular window. Typically, only one signal instance from each BTS is used for position determination. If the timing of the received signal (e.g., such as round trip delay) is used for position determination, then the earliest arriving signal instance is typically selected. If the power of the received signal is used (e.g., as described above for the power comparison schemes), then the strongest signal instance may be selected. In either case, one signal instance may be selected for each BTS, and this selected signal instance may be deemed as the received signal for the BTS. Thus, the received signals at the terminals may be determined based on the PN phase (and possibly the power) of the pilots received at the terminal.

For a CDMA system, each BTS is assigned a specific PN offset that is different from the PN offsets assigned to neighboring BTSs. However, due to a limited number of PN offsets available, multiple BTSs in the system may be assigned with the same PN offset. Thus, in certain instances, it is not possible to unambiguously identify a given BTS based solely on the PN phase of the signal received from that BTS.

For each received signal to be identified, the list of candidate BTSs for this signal may be those assigned with the same PN offset as that of the received signal. For example, if the PN phase of the received signal indicates that the transmitting BTS has a PN offset of 25, then the candidate BTSs for this signal would all have PN offset of 25.

Power Prediction

The predicted power for each BTS may be obtained based on empirical formulas. For example, the predicted power for a given candidate BTS may be expressed as:

$$W = P + G - L_{path}, \quad \text{Eq (15)}$$

where $L_{path}$ is the total loss for the propagation path between the BTS and the terminal. The total path loss can be provided by the path loss prediction model. The quantities in equation (13) are given in units of dB.

The total path loss $L_{path}$ includes a number of components and may be expressed as:

$$L_{path} = L_{basic} + L_{topo} + L_{cover}, \quad \text{Eq (16)}$$

where $L_{basic}$ represents the empirical path loss in a reference environment, which is typically an urban area, $L_{topo}$ represents an empirical topological correction factor that depends on the terrain height profile of the path (i.e., $L_{topo}$ corresponds to the parameter T in the path loss prediction model), and $L_{cover}$ represents an empirical correction factor that describes the deviation from $L_{basic}$ for different types of land cover (i.e., $L_{cover}$ corresponds to the parameter L in the model).

The basic path loss $L_{basic}$ in an urban area may be obtained using a formula provided by the Okumura-Hata model, which can be expressed as:

$$L_{basic} = 69.55 + 26.16 \cdot \log_{10}(f_c) - 13.82 \cdot \log_{10}(h_b) - a(h_m) + (44.9 - 6.55 \cdot \log_{10}(h_b)) \cdot \log_{10}(d) \quad \text{Eq (17)}$$

where $f_c$ is frequency in MHz (150-1500 MHz), $h_b$ is the effective height of the BTS antenna in meters (30-200 meters), $h_m$ is the effective height of the terminal antenna in meters (1-10 meters), d is the distance between the BTS and the terminal in Km (1-20 Km), and $a(h_m)$ is a correction factor for the terminal antenna height, which is given as:

$a(h_m) = (1.1 \cdot \log_{10}(f_c) - 0.7) \cdot h_m - (1.56 \cdot \log_{10}(f_c) - 0.8)$, for large/small cities, $a(h_m) = 3.2 \cdot (\log_{10}(11.75 \cdot h_m))^2 - 4.97$, for large cities and $f_c > 400$ MHz.

Equation (15) is valid over a specific range of values for each parameter, which is given within the parenthesis.

The topological correction factor $L_{topo}$ may be used when the terrain is not flat (e.g., with undulation greater than 20 meters). This correction factor may be expressed as:

$$L_{topo} = K_h + K_s + K_i, \quad \text{Eq (18)}$$

where $K_h$ is a rolling hill correction factor, $K_s$ is an inclination correction factor, and $K_i$ is an isolated ridge correction factor.

The $K_h$, $K_s$, and $K_i$ correction factors may be determined for various topologies and stored in a database.

The land cover correction factor $L_{cover}$ describes the effect of obstructions located on the ground, such as building and vegetation. Since the terminal antenna is normally at ground level, the signal has to pass over, around, or even through the obstructions in order to reach the terminal. The formula used to estimate path loss in a wireless link is typically given for an urban area environment. The land cover correction factor can then be used to adjust the value of path loss provided by the formula. For example, for environments such as rural area and water, the path loss is much smaller than the path loss value provided by the formula. Hence, a positive land cover correction factor can be subtracted from the value provided by the formula to obtain a more accurate predicted path loss value for the environments under consideration. The land cover correction factor may be determined for various types of land covers (e.g., water, open area, forest, urban area, suburban area, metropolitan, and so on) and stored in a database.

The Okumura-Hata model is further described in a paper by Okumura Y et al., entitled "Field Strength and its Variability in VHF and UHF Land Mobile Radio Service," Review of the El Comm Lab, Vol 16, No. 9-10, 1968, which is incorporated herein by reference The predicted power for each BTS may also be obtained based on measured data (i.e., field data) instead of a path loss prediction model. The received powers for BTSs may be measured by terminals located throughout the system. The measured powers and terminal locations (which may be accurately determined using GPS) may then be reported back to the system. A database may then be maintained with the measured power for the BTSs, at various locations throughout the system. Alternatively or additionally, test terminals may be used to measure power at various locations throughout the system. In any case, the predicted powers for the BTSs may be obtained based on the measured powers that are stored in the database.

Received relative signal strength Ec/Io may be used instead of measured power to identify the BTSs for the received signals. However, it is typically easier to predict the received power at the terminal than the received relative signal strength.

System

Figure 11:
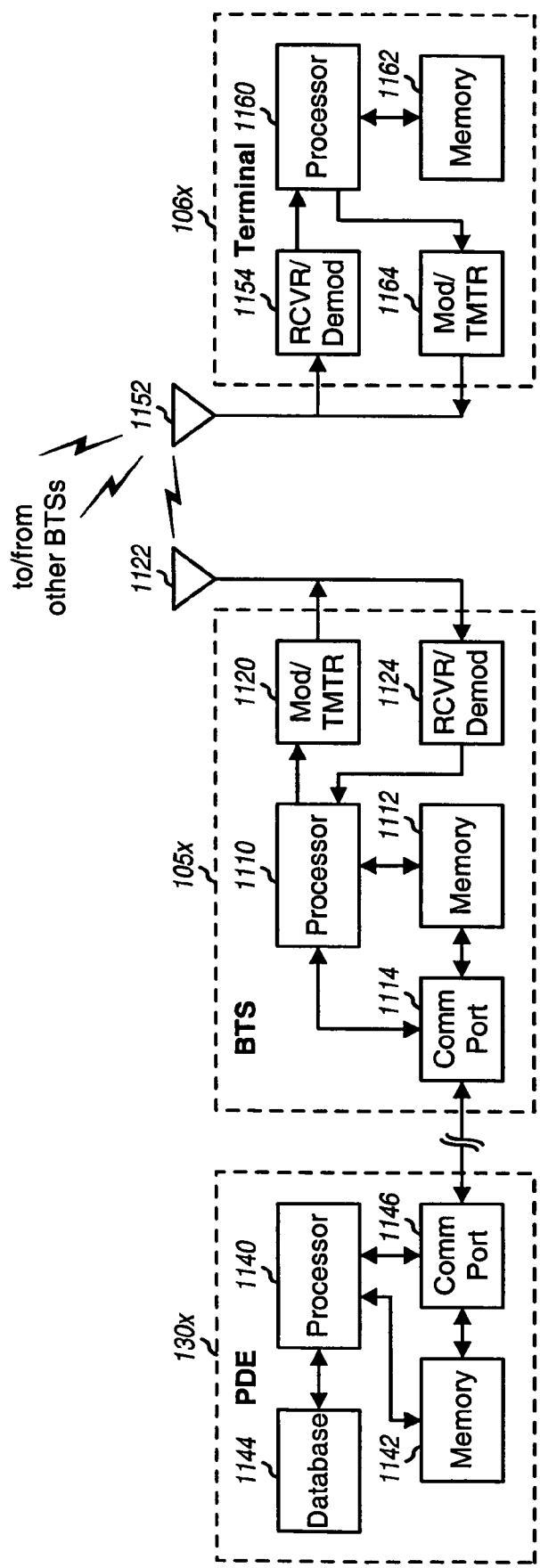
FIG. 11 is a simplified block diagram of various entities in the system shown in FIG. 1.

FIG. 11 is a simplified block diagram of various entities of system 100. Terminal 106x may be a cellular telephone, a computer with a wireless modem, a stand-alone position determining unit, or some other unit. BTS 105x is shown operatively coupled to a PDE 130x (e.g., via BSC 120, which is not shown in FIG. 11 for simplicity).

On the forward link, BTS 105x transmits data, pilot, and signaling to the terminals within its coverage area. These various types of data are processed (e.g., coded, modulated, filtered, amplified, quadrature modulated, and upconverted) by a modulator/transmitter (Mod/TMTR) 1120 to provide a forward link modulated signal, which is then transmitted via an antenna 1122 to the terminals.

Terminal 106x receives the forward link modulated signals from a number of BTSs (including BTS 105x) at an antenna 1152. The receiver input signal from antenna 1152 thus includes a number of received signals and is provided to a receiver/demodulator (RCVR/Demod) 1154. RCVR/Demod 1154 then processes the receiver input signal in a complementary manner to provide various types of information that may be used for BTS identification and position determination. In particular, RCVR/Demod 1154 may provide the time of arrival and either the measured power or received signal strength for each received signal. RCVR/Demod 1154 may implement a rake receiver that is capable of concurrently processing multiple signal instances (or multipath components) for a number of BTSs. The rake receiver includes a number of finger processors (or fingers), each of which may be assigned to process and track a particular multipath component.

On the reverse link, terminal 106x may transmit data, pilot, and/or signaling to the reference BTS (e.g., BTS 105x). These various types of data are processed by a modulator/transmitter (Mod/TMTR) 1164 to provide a reverse link modulated signal, which is then transmitted via antenna 1152. BTS 105x receives the reverse link modulated signal from terminal 106x at antenna 1122, and the receiver input signal from antenna 1122 is provided to a receiver/demodulator (RCVR/Demod) 1124. RCVR/Demod 1124 then processes the receiver input signal in a complementary manner to provide various types of information, which may then be provided to a processor 1110.

In the embodiment shown in FIG. 11, a communication (Comm) port 1114 within BTS 105x operatively couples (e.g., via a BSC) to a communication port 1146 within PDE 130x. Communication ports 1114 and 1146 allow BTS 105x and PDE 130x to exchange pertinent information for BTS identification and position determination. Some of this information may have been received from terminal 106x.

The identification of BTSs and the determination of the terminal position using predicted powers and possibly delays may be performed by terminal 106x, BTS 105x, PDE 130x, or some other network entity. The entity performing the BTS identification and/or position determination is provided with the pertinent information. Such information may include, for example, a list of signals received by terminal 106x, the measured powers (or received signal strength) and possibly propagation delays for these received signals, the identity of the reference BTS, and so on.

The processing to identify the BTSs for the received signals and to determine a position estimate for the terminal may be performed by (1) a processor 1160 within terminal 106x, (2) processor 1110 within BTS 105x, or (3) a processor 1140 within PDE 130x. Memory units 1112, 1142, and 1162 may be used to store various types of information used for BTS identification and position determination, such as, for example, the list of received signals, their measured powers and delays, and so on. Memory units 1112, 1142, and 1162 may also store program codes and data for processors 1110, 1140, and 1160, respectively. A database 1144 within PDE 130x may be used to store information used for the path loss prediction model, such as terrain and land cover/land use information. Alternatively or additionally, database 1144 may be used to store field data for measured powers and possibly delays at various locations throughout the system.

The method and apparatus described herein may be implemented by various means, such as in hardware, software, or a combination thereof. For a hardware implementation, the method and apparatus may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the method described herein may be implemented with modules (e.g., procedures, functions, and so on) that perform the functions described herein. The software codes may be stored in a memory unit (e.g., memory unit 1112, 1142, or 1162 in FIG. 11) and executed by a processor (e.g., processor 1110, 1140, or 1160). The memory unit may be implemented within the processor or external to the processor, in which case it can be communicatively coupled to the processor via various means as is known in the art.

Headings are included herein for reference and to aid in locating certain sections. These headings are not intended to limit the scope of the concepts described therein under, and these concepts may have applicability in other sections throughout the entire specification.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for identifying transmitters in a wireless communication system, comprising:
    obtaining a plurality of received signals for a plurality of transmitters, wherein the plurality of received signals are received by a user terminal; and
    determining a transmitter for each received signal by
        determining a measured power for the received signal,
        determining a list of a plurality of candidate transmitters for the received signal,
        obtaining predicted power for each candidate transmitter in the list, and
        identifying the transmitter for the received signal based on predicted powers for the candidate transmitters and measured power for the received signal.

2. The method of claim 1, wherein the determining the transmitter for each received signal further includes
    comparing the predicted power for each candidate transmitter against the measured power for the received signal, and wherein the identified transmitter for the received signal is the candidate transmitter with predicted power closest to the measured power.

3. The method of claim 1, wherein the determining the transmitter for each received signal further includes
    determining a coverage zone to use for the received signal, and wherein the predicted power for each candidate transmitter is obtained based on the coverage zone.

4. The method of claim 3, wherein the predicted power for each candidate transmitter is obtained for a centroid of the coverage zone.

5. The method of claim 3, wherein the coverage zone is derived based on one or more coverage areas of one or more identified transmitters.

6. The method of claim 1, wherein the predicted power for each candidate transmitter is determined based on a path loss prediction model.

7. The method of claim 6, wherein the path loss prediction model is based on Okumura-Hata model.

8. The method of claim 1, wherein the predicted power for each candidate transmitter is determined based on field data.

9. The method of claim 1, wherein the wireless communication system is a CDMA system.

10. The method of claim 9, wherein the list of candidate transmitters for each received signal comprises a list of base station transceivers (BTSs) with same PN offset.

11. The method of claim 1, wherein the determining the transmitter for each received signal further includes
obtaining predicted propagation delay for each candidate transmitter in the list, and
wherein the transmitter for the received signal is further identified based on predicted propagation delays for the candidate transmitters and measured propagation delay for the received signal.

12. The method of claim 11, wherein the determining the transmitter for each received signal further includes
determining a power delta for each candidate transmitter as a difference between the predicted power for the candidate transmitter and the measured power of the received signal,
determining a propagation delay delta for each candidate transmitter as a difference between the predicted propagation delay for the candidate transmitter and the measured propagation delay for the received signal, and
obtaining a weighted sum of the power delta and the propagation delay delta for each candidate transmitter, and wherein the identified transmitter for the received signal is the candidate transmitter with a smallest weighted sum.

13. A method for determining transmitters in a wireless communication system, comprising:
obtaining a plurality of received signals for a plurality of transmitters, wherein the plurality of received signals are received by a user terminal;
determining measured power for each of the plurality of received signals; and
determining a transmitter for each received signal by
determining a list of candidate transmitters for the received signal,
determining an identified transmitter,
determining measured power of the identified transmitter,
obtaining predicted power for each candidate transmitter in the list,
obtaining predicted power for the identified transmitter,
determining the transmitter for the received signal based on predicted powers for the candidate transmitters, the predicted power for the identified transmitter, measured power of the received signal, and measured power for the identified transmitter.

14. The method of claim 13, wherein the determining the transmitter for each received signal further includes
comparing a relative predicted power for each candidate transmitter against a relative measured power for the received signal, the relative predicted power being a difference between the predicted power for the candidate transmitter and the predicted power for the identified transmitter, the relative measured power being a difference between the measured power of the received signal and the measured power for the identified transmitter, and
wherein the identified transmitter for each received signal is the candidate transmitter with relative predicted power closest to the relative measured power.

15. The method of claim 13, wherein the determining the transmitter for each received signal further includes
determining a coverage zone to use for the received signal based on one or more coverage areas of one or more identified transmitters, and wherein the predicted power for each candidate transmitter is obtained based on the coverage zone.

16. The method of claim 13, wherein the wireless communication system is a CDMA system.

17. The method of claim 13, wherein the determining the transmitter for each received signal further includes
obtaining predicted propagation delay for each candidate transmitter in the list, and
obtaining predicted propagation delay for the identified transmitter, and
wherein the transmitter for the received signal is further identified based on predicted propagation delays for the candidate transmitters, the predicted propagation delay for the identified transmitter, measured propagation delay for the received signal, and measured propagation delay for the identified transmitter.

18. The method of claim 17, wherein the determining the transmitter for each received signal further includes
determining a relative power delta for each candidate transmitter,
determining a relative propagation delay delta for each candidate transmitter, and
obtaining a weighted sum of the relative power delta and the relative propagation delay delta for each candidate transmitter, and wherein the identified transmitter for the received signal is the candidate transmitter with a smallest weighted sum.

19. An apparatus operable to identify transmitters in a wireless communication system, comprising:
means for obtaining a plurality of received signals for a plurality of transmitters, wherein the plurality of received signals are received by a user terminal;
means for determining a plurality of lists of candidate transmitters for the plurality of received signals, one candidate list for each received signal;
means for obtaining predicted power for each candidate transmitter;
means for determining a measured power for each of the plurality of received signals; and
means for identifying the transmitter for each received signal based on measured power for the received signal and predicted powers for the candidate transmitters in the list determined for the received signal.

20. The apparatus of claim 19, further comprising:
means for determining a coverage zone to use for each received signal, and wherein the predicted power for each candidate transmitter of each received signal is obtained based on the coverage zone for the received signal.

21. The apparatus of claim 19, wherein the predicted power for each candidate transmitter is determined based on a path loss prediction model.

22. The apparatus of claim 21, wherein the path loss prediction model is based on Okumura-Hata model.

23. The apparatus of claim 21, further comprising: means for storing information used for the path loss prediction model.

24. The apparatus of claim 19, further comprising:
means for obtaining predicted power for an identified transmitter for each received signal, and wherein the transmitter for each received signal is further identified based on the predicted power for the identified transmitter for the received signal.

25. The apparatus of claim 19, further comprising:
means for obtaining predicted propagation delay for each candidate transmitter, and
wherein the transmitter for each received signal is further identified based on measured propagation delay for the received signal and predicted propagation delays for the candidate transmitters in the list determined for the received signal.

26. The apparatus of claim 19, wherein the wireless communication system is a CDMA system.

* * * * *